(12) United States Patent
Gerolemou (10) Patent No.: US 9,004,711 B2
(45) Date of Patent: Apr. 14, 2015

(54) EYEGLASS LIGHT

(76) Inventor: Helen Kallou Gerolemou, Sandy Springs, GA (US)

( * ) Notice: Subject to any disclaimer, the term of this patent is extended or adjusted under 35 U.S.C. 154(b) by 0 days.

(21) Appl. No.: 13/361,389

(22) Filed: Jan. 30, 2012

(65) Prior Publication Data

US 2012/0195025 A1 Aug. 2, 2012

Related U.S. Application Data

(60) Provisional application No. 61/437,803, filed on Jan. 31, 2011.

(51) Int. Cl.
| | |
|---|---|
| *F21V 21/08* | (2006.01) |
| *F21L 4/00* | (2006.01) |
| *H04M 1/22* | (2006.01) |
| *F21L 4/04* | (2006.01) |
| *F21V 21/00* | (2006.01) |
| *F21V 21/088* | (2006.01) |
| *G02C 11/04* | (2006.01) |
| *F21V 21/084* | (2006.01) |
| *F21V 21/14* | (2006.01) |
| *F21V 21/32* | (2006.01) |
| *F21Y 101/02* | (2006.01) |

(52) U.S. Cl.
CPC ............ *F21V 21/0885* (2013.01); *G02C 11/04* (2013.01); *F21L 4/00* (2013.01); *F21V 21/084* (2013.01); *F21V 21/145* (2013.01); *F21V 21/32* (2013.01); *F21Y 2101/02* (2013.01)

(58) Field of Classification Search
CPC ...... F21V 21/08; F21V 21/084; F21V 21/088; F21V 21/0885; F21L 4/00; F21L 11/00; G02C 11/04; G02C 11/10

USPC ............... 362/84, 98, 99, 103, 105, 187, 188, 362/190, 191, 198, 199, 249.01, 249.02, 362/249.03, 249.04, 285, 288, 396

See application file for complete search history.

(56) References Cited

U.S. PATENT DOCUMENTS

| | | | | |
|---|---|---|---|---|
| 1,692,394 A | * | 11/1928 | Sundh ............................ | 362/198 |
| 2,648,762 A | * | 8/1953 | Dunkelberger ............... | 362/198 |
| 5,183,193 A | * | 2/1993 | Brandell ........................ | 224/219 |
| 5,369,556 A | * | 11/1994 | Zeller ............................ | 431/344 |
| 6,666,563 B2 | * | 12/2003 | Brown ............................ | 362/84 |

(Continued)

OTHER PUBLICATIONS

Salton, Jeff; "Nachteule makes night-time reading more 'enlightening'"; Sep. 20, 2009; http://www.gizmag.com/nachteule-personal-reading-light/12894/.*

*Primary Examiner* — John A Ward
*Assistant Examiner* — Alexander Garlen
(74) *Attorney, Agent, or Firm* — Crose Law LLC; Bradley D. Crose (57) ABSTRACT

An eyeglass light assembly is disclosed. The eyeglass light assembly includes an ultra lightweight and configurable eyeglass light adapted to removably and interchangeably attach to an eyeglass frame or to be integrally formed with the eyeglass frame. The eyeglass light is adapted to provide a multiplicity of angle, pivot, and rotation configurations for varied use and adaptation at directing emitted light from an eyeglass frame. The eyeglass light is adapted to pivot and bend in various locations. The eyeglass light provides for hands-free use when mounted. In one embodiment, the eyeglass light includes and a flexible stem upon which the light is coupled. The stem is further coupled to clip members adapted to couple to one another to secure the assembly to eyeglass frames.

9 Claims, 10 Drawing Sheets

(56) References Cited

U.S. PATENT DOCUMENTS

| | | | |
|---|---|---|---|
| 6,808,289 B2 * | 10/2004 | Reed .............................. | 362/198 |
| D504,535 S * | 4/2005 | Shiu ............................... | D26/60 |
| 6,974,226 B2 * | 12/2005 | Chang ............................ | 362/103 |
| 7,661,818 B2 | 2/2010 | Waters | |
| 7,686,467 B2 | 3/2010 | Nelson et al. | |
| 7,699,486 B1 | 4/2010 | Beiner | |
| 7,699,492 B2 | 4/2010 | Levine | |
| D630,358 S | 1/2011 | Nelson et al. | |
| 7,938,553 B1 | 5/2011 | Beiner | |
| 2002/0131263 A1 * | 9/2002 | Naghi et al. ..................... | 362/98 |
| 2008/0068824 A1 * | 3/2008 | Wang ............................. | 362/103 |
| 2011/0188236 A1 * | 8/2011 | Eichelberger et al. ......... | 362/191 |

* cited by examiner

EYEGLASS LIGHT

CROSS-REFERENCE TO RELATED APPLICATION(S)

The present non-provisional patent application claims the benefit of priority of U.S. Provisional Patent Application No. 61/437,803, which is entitled "EYEGLASS LIGHT", which was filed on Jan. 31, 2011, and which is incorporated in full by reference herein.

FIELD OF THE INVENTION

The technology described herein relates generally to the fields of lighting devices, portable illumination devices, and utility lamps configured to clip onto another object. More specifically, this technology relates to an ultra lightweight and configurable eyeglass light adapted to removably and interchangeably attach to an eyeglass frame. Furthermore, this technology relates to an eyeglass light adapted with a multiplicity of angle, pivot, and rotation configurations for varied use and adaptation at directing emitted light from an eyeglass frame toward a desired area of illumination.

BACKGROUND OF THE INVENTION

Portable illumination and lighting devices are known in the background art. Such illumination devices are useful in providing light on a temporary basis to a specific desired illumination area.

By way of example, a book light is a well-known portable illumination device. Book lights typically include a clip adapted to attach to a book and a light extending from the clip. A book light typically can be maneuvered by a user to illuminate a specific book page area to enable well-lit reading otherwise prohibited by a low-light environment. Numerous practical and ergonomic issues exist with these known devices.

There are many shortcomings and deficiencies with known portable illumination devices such that none would be suitable with or adapted for use with an eyeglass frame and the specific needs required for application to an eyeglass frame. The technology described herein addresses these shortcomings and deficiencies.

Related utility and design patents known in the art include the following.

U.S. Pat. No. D630,358 issued to Nelson et al. on Jan. 4, 2011, discloses the ornamental design for an illuminating device.

U.S. Pat. No. 7,686,467, issued to Nelson et al. on Mar. 30, 2010, discloses an illuminating book light. The illuminating device may include a head, a neck and a body. The illuminating device may be manipulated into numerous positions including extended and nested positions so that the light source may be positioned inside the securing structure in the nested position and outside the securing structure in the extended position. Such an illuminating device may be desirable for use, for example, as a portable illuminator, book light, and travel light.

U.S. Pat. No. 7,699,492, issued to Levine on Apr. 20, 2010, discloses a lighting device with a clip. The lighting device can be battery-powered and can include one or more LEDs within a light source housing. The device can also include a base connected to the light source housing, and a clip removably connected to the base. The base can act as a stable support for the lighting device when the lighting device is positioned upright over a flat support surface with the clip disconnected from the base. Similarly, the clip (or the clip in conjunction with a portion of the base) can act as a stable support for the lighting device when the lighting device is positioned upright over a flat support surface with the clip connected to the base. The clip can be configured to releasably connect to the base in a first orientation and a second orientation substantially opposite to the first orientation.

U.S. Pat. No. 7,699,486, issued to Beiner on Apr. 20, 2010, discloses an illuminated eyeglass assembly. The illuminated eyeglass assembly includes one or more temple members having an integral lighting assembly structured and disposed to provide an illumination region proximate a user, for example, to illuminate an item within an arm's length of the user. Each integral light assembly includes at least one light source interconnected to a power source via a switch mechanism. Each of the light sources produce a light beam, and the light sources are structured and disposed such that the light beams provide an illumination region immediately proximate the user, thereby permitting the user to perceptively view an item in a low light environment, such as, to permit the user to read menu or a check in a restaurant or nightclub. A system is provided to retrofit an existing eyeglass assembly with one or more temple member having an integral lighting assembly.

U.S. Pat. No. 7,661,818, issued to Waters on Feb. 16, 2010, discloses an illuminated eyeglass assembly. A clip-on light apparatus is provided having a polyaxial coupling joint between a light module and frame to permit the light module to be pivoted about a plurality of axes relative to the frame for directing light in a plurality of directions. The polyaxial coupling joint preferably permits pivoting of the light module about at least two orthogonal axes. In one form, the light module is mounted to a pivot shaft about which the module can be turned with the pivot shaft itself being pivoted along one of the two orthogonal pivot axes.

U.S. Pat. No. 7,938,553, issued to Beiner on May 10, 2011, discloses an illuminated eyeglass assembly. The illuminated eyeglass assembly includes one or more temple members having an integral lighting assembly structured and disposed to provide an illumination region proximate a user, for example, to illuminate an item within an arm's length of the user. Each integral light assembly includes at least one light source interconnected to a power source via a switch mechanism. Each of the light sources produce a light beam, and the light sources are structured and disposed such that the light beams provide an illumination region immediately proximate the user, thereby permitting the user to perceptively view an item in a low light environment, such as, to permit the user to read menu or a check in a restaurant or nightclub. A system is provided to retrofit an existing eyeglass assembly with one or more temple member having an integral lighting assembly.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

SUMMARY OF THE INVENTION

In various exemplary embodiments, the technology described herein provides an eyeglass light assembly. The eyeglass light assembly is an ultra lightweight and configurable eyeglass light adapted to removably and interchangeably attach to an eyeglass frame or to be integrally formed with the eyeglass frame. The eyeglass light assembly is adapted to provide a multiplicity of angle, pivot, and rotation configurations for varied use and adaptation at directing emitted light from an eyeglass frame. The eyeglass light assembly is adapted to pivot and bend in various locations. The eyeglass light assembly provides for hands-free use when mounted. The eyeglass light can be manufactured in a multiplicity of sizes.

In one embodiment, the eyeglass light assembly includes and a flexible stem upon which the light is coupled. The stem is further coupled to clip members adapted to couple to one another to secure the assembly to eyeglass frames.

The eyeglass light assembly is preferably adapted to couple to eyeglasses; however, in at least one embodiment, the eyeglass light assembly and the eyeglasses are integrally formed. The eyeglass light assembly is precision engineered and preferably has a weight of less than one ounce. It is imperative that the eyeglass light assembly be of a very light weight to ensure that no weight burden is placed upon the eyeglasses such that they might slide or be uncomfortable to the wearer.

In embodiments wherein the eyeglass light assembly is adapted to couple to eyeglasses, a preferred point of attachment is the temple area of the eyeglasses. Eyeglasses are known to vary in shape, size, style, and so forth, but most have rims defined to hold a pair of lenses, a bridge adapted to rest upon the nose of the wearer, and temples to secure the rims to the wearer, typically with the temples placed over the tops of the ears to secure the eyeglasses. The eyeglass light assembly is adapted to couple quickly and easily to the temples. Additionally, varied sizes of the eyeglass light assembly can be manufactured to accommodate varied sizes, shapes, and styles of eyeglass temples.

In one exemplary embodiment, the eyeglass light assembly includes an illumination device. The illumination device is a light that is, in at least one embodiment, a light-emitting diode (LED). The eyeglass light assembly can utilize a single LED or a multiplicity of LED lights.

The eyeglass light assembly includes a light cover in which the LED is placed. The light cover protects the LED from impact or touch. Located behind the LED and within the light cover is a reflector that provides directional illumination of the light emitted from LED. The LED is covered with a transparent cover, such as an epoxy lens or case. As such the LED is recessed and sealed.

The eyeglass light assembly includes a stem. The stem is coupled to the light cover. The stem is a flexible tube such as a lightweight metal tube that is bendable by the wearer of the eyeglass light assembly to direct light to a particular area of illumination. The stem, in at least one embodiment, serves as a conduit for a wiring harness, or the like, to transport power to the LED. The stem may include fiber optics. With the stem the eyeglass light assembly is adapted to provide a multiplicity of angle, pivot, and rotation configurations for varied use and adaptation at directing emitted light from an eyeglass frame to a desired area of illumination.

The eyeglass light assembly includes an adapter. The adapter is configured to receive securely one end of the stem, the end opposite the light cover. The adapter includes adapter lid, which is configured to secure the adapter to the base. The adapter further includes push button. The push button is configured to actuate a push button switch disposed within the base and adapter. As such, the operator/wearer of the eyeglasses and eyeglass light assembly can actuate the LED to illuminate a desired area of illumination, such as a menu, book, program, and so forth.

The eyeglass light assembly includes a clip assembly having a first clip member and a second clip member. Both the first clip member and the second clip member are configured to latch or snap together, or like fastening means, at a latch area, for example. Both the first clip member and the second clip member are configured to surround the temple of the eyeglasses. It at least one embodiment, foam, or like soft cushioning material, is utilized with the first clip member and second clip member in order to protect the temples.

The eyeglass light assembly includes a power source. In at least one embodiment, the power source is a small, lightweight battery. The power source is preferably stored within the base.

The power source can be connected to a contact strip for connectivity to a wiring harness to reach and power the LED. In at least one embodiment, the eyeglass light assembly can further include a controller. The controller is configured to provide programmed functionality to the eyeglass light assembly. The controller can be pre-programmed and unalterable by the wearer in one embodiment. Alternatively, the controller can include settings reconfigurable by the wearer.

Advantageously, the technology described herein provides for the hands free operation of an eyeglass light. Also advantageously, the eyeglass light described herein provides for a multiplicity of angle, pivot, and rotation configurations for varied use.

There has thus been outlined, rather broadly, the features of this technology in order that the detailed description that follows may be better understood, and in order that the present contribution to the art may be better appreciated. There are additional features of the invention that will be described and which will form the subject matter of the claims. Additional aspects and advantages of this technology will be apparent from the following detailed description of an exemplary embodiment which is illustrated in the accompanying drawings. The technology described is capable of other embodiments and of being practiced and carried out in various ways. Also, it is to be understood that the phraseology and terminology employed are for the purpose of description and should not be regarded as limiting.

DETAILED DESCRIPTION

In various exemplary embodiments, the technology described herein provides an eyeglass light assembly. The eyeglass light assembly is an ultra lightweight and configurable eyeglass light adapted to removably and interchangeably attach to an eyeglass frame or, alternatively, to be integrally formed with the eyeglass frame.

In at least one embodiment, the eyeglass light assembly comprises an overall weight within the range of 0.1 ounces to 0.4 ounces in weight. In at least one embodiment, the eyeglass light assembly comprises an overall weight within the range of 0.1 ounces to 0.9 ounces in weight.

The eyeglass light assembly is adapted to provide a multiplicity of angle, pivot, and rotation configurations for varied use and adaptation at directing emitted light from an eyeglass frame to a desired area of illumination. The eyeglass light is adapted to pivot and bend in various locations. The eyeglass light provides for hands-free use when mounted. The eyeglass light can be manufactured in a multiplicity of sizes.

Referring now to the FIGS. 1 through 10, an eyeglass light assembly 10 is depicted. The eyeglass light assembly 10 is preferably adapted to couple to eyeglasses. However, in at least one embodiment, the eyeglass light assembly 10 and the eyeglasses are integrally formed.

The eyeglass light assembly 10 is precision engineered and in a preferred embodiment has a weight of less than one ounce. In at least one other exemplarily embodiment, the eyeglass light assembly 10 weighs less than one half of one ounce. It is imperative that the eyeglass light assembly 10 be of a very light weight to ensure that no weight burden is placed upon the eyeglasses such that they might slide, tilt, shift, or be otherwise uncomfortable to the wearer.

In embodiments wherein the eyeglass light assembly 10 is adapted to couple to eyeglasses, a preferred point of attachment is the temple area of the eyeglasses. Eyeglasses are known in the background art to vary in shape, size, style, and so forth, but most have rims defined to hold a pair of lenses, a bridge adapted to rest upon the nose of the wearer, and temples to secure the rims to the wearer, typically with the temples placed over the tops of the ears to secure the eyeglasses.

The eyeglass light assembly 10 is adapted to couple quickly and easily to the temples of the eyeglasses. Likewise, the eyeglass light assembly 10 is adapted to be uncoupled quickly and easily from the eyeglasses 10 when not in use or when it is desired not to be worn. Additionally, varied sizes of the eyeglass light assembly 10 can be manufactured to accommodate varied sizes, shapes, and styles, and so forth, of eyeglass temples. By way of example, the eyeglass light assembly 10 can be manufactured for a generally flat temple, a generally cylindrical temple, and so forth. Also, by way of example, the eyeglass light assembly 10 can be manufactured for adult size eyeglasses and children size eyeglasses. Additionally, as will be appreciated by one of ordinary skill in the art, after reading this disclosure, the exact location for coupled to eyeglasses is altered in various alternative embodiments.

The eyeglass light assembly 10 includes an illumination device. The illumination device is a light that is, in at least one embodiment, a light-emitting diode (LED) 24, a reliable lightweight semiconductor light source. The eyeglass light assembly 10 can utilize a single LED 24 or a multiplicity of LED lights (not shown) in alternative embodiments. By way of example, and not of limitation, an 8 mm LED is used in at least one embodiment. Sizes, colors, and quantities selected of the LED 24 can vary according to specific application desired by the wearer.

The eyeglass light assembly 10 includes a light source housing disposed at a distal end of the eyeglass light assembly 10. The eyeglass light assembly 10 includes a light source disposed within the light source housing and configured to illuminate in a direction away from the eyeglass light assembly 10.

The eyeglass light assembly 10 includes light cover 14 in which the LED 24 is placed. The light cover 14 protects the LED 24, or other light configuration, from impact or touch. The light cover 14 is manufactured of a very lightweight material such as a lightweight plastic material. In various embodiments, the light cover 14 also includes a tip 12. The tip 12 can be recessed, tapered, and so forth, in various embodiments. The tip 12 provides additional protection to the LED 24 from impact or touch. In various embodiments, the light cover 14 also includes adapted end 20. The adapter end 20 can vary in shape, size, and design, but is configured to couple the light cover 14 to a stem 16 (discussed below). The tip 12 and the adapter end 20 are also manufactured of a very lightweight material such as a lightweight plastic material. Additionally, the light cover 14, tip 12, and adapter end 20 are integrally formed in at least one embodiment.

Located behind the LED 24 and within the light cover 24 is a reflector 22 or reflector tube that forms a reflective cavity and provides directional illumination of the light emitted from LED 24, thus directing the light outwardly from the LED 24 to a desired area of illumination. The reflector 22 is manufactured of a very lightweight material such as a lightweight plastic material. The reflector 22 is configured to withstand the heat of an LED 24 or like light source.

The LED 24 is covered with a transparent cover 38, such as a clear epoxy lens or case, mounted within the light cover 14, or within the tip 12 of the light cover 14. As such the LED 24 is recessed and sealed. This transparent cover 38 allows for light to pass, yet protects the LED from touch or impact.

The eyeglass light assembly 10 also includes a stem 16 coupled to the light source housing disposed at the distal end of the eyeglass light assembly 10 and coupled to a base (discussed below) disposed at the proximal end of the eyeglass light assembly 10.

The stem 16 is coupled to the light cover 14. The stem 16 is a flexible tube such as a lightweight metal or plastic tube that is bendable by the wearer of the eyeglass light assembly 10 to direct light to a particular area of illumination. The stem 16, in at least one embodiment, serves as a conduit for a wiring harness 48, or the like, to transport power to the LED 24.

A wiring assembly 48 is disposed generally within the stem 16 of the eyeglass light assembly 10. The wiring assembly 48 is configured to couple a power source to the light source to power the light source. The wiring assembly 48 is configured for quick assembly and connectivity to the power source and to the light source.

Through utilization of the stem 16, the eyeglass light assembly 10 is adapted to provide a multiplicity of angle, pivot, and rotation configurations for varied use and adaptation at directing emitted light from an eyeglass frame 12 to a desired area of illumination. With the stem 16, the eyeglass light assembly 10 is adapted to pivot and bend in various locations, as operatively selected by the wearer.

The eyeglass light assembly 10 includes an adapter 32. The adapter 32 is configured to receive securely one end of the stem 16, the end opposite the LED 24 and light cover 14. The adapter 32 is manufactured of a very lightweight material such as a lightweight plastic material. The adapter 32 can be integrally formed with the base assembly 26. The base assembly 26 is disposed at a proximal end of the eyeglass light assembly 10 and is configured to removably attach the eyeglass light assembly 10 to an eyeglass frame.

The adapter 32 further includes push button 18. Push button 18 is configured to actuate a push button switch disposed within the base assembly 26 and adapter 32. As such, the operator/wearer of the eyeglasses 12 and eyeglass light assembly 10 can actuate the LED 24 and then illuminate a desired area of illumination, such as a menu, book, program, and so forth. Additionally, in at least one alternative embodiment, button 18 is replaced with a dial-type switch, rheostat, or the like to provide the user an ability to dim or brighten as needed in a particular lighting environment. Furthermore, in at least one alternative embodiment, button 18 is replaced with a high/low beam switch such that the user operatively selects between a high beam and a low beam for the light source.

The base assembly 26 includes a base housing 40. A latchable door 34 is disposed upon the base housing 40. The latchable door 34 is configured to provide access to a power source 46 and other internal components. A latch 54 is disposed upon the latchable door 34 and is configured to provide access to the base housing 40. The base housing 40, latchable door 34, and latch 54 are manufactured of a very lightweight material such as a lightweight plastic material. The base housing 40 and the latchable door 34 are integrally formed in at least one embodiment. The base housing 40 and the latchable door 34 are hingedly coupled it at least one embodiment. The base housing 40 and the latchable door 34 can further includes ridges 56 in at least one embodiment. The ridges 56 aid in the use of the eyeglass light assembly 10 for gripping and do so forth. The latchable door 34 also can include an additional latch 68 to further secure the latchable door 34 to the baser housing 40.

The eyeglass light assembly 10 includes a clip assembly having a first clip member 28 and a second clip member 30. Both the first clip member 28 and the second clip member 30 are manufactured of a very lightweight material such as a lightweight plastic material.

The first clip member 28 and the second clip member 30 are configured to latch or snap together, or like fastening means, at latch area 36, for example. Both the first clip member 28 and the second clip member 30 are configured to surround the temple 20 of the eyeglasses 12. It at least one embodiment, foam, or like soft cushioning material, is utilized with the first clip member 28 and second clip member 30 in order to protect (not scratch) the temples 20.

In at least one embodiment, the first clip member 28 and the second clip member 30 are integrally formed. In at least one embodiment, the first clip member 28 and the second clip member 30 are hingedly coupled via a hinge 66.

Figure 1:
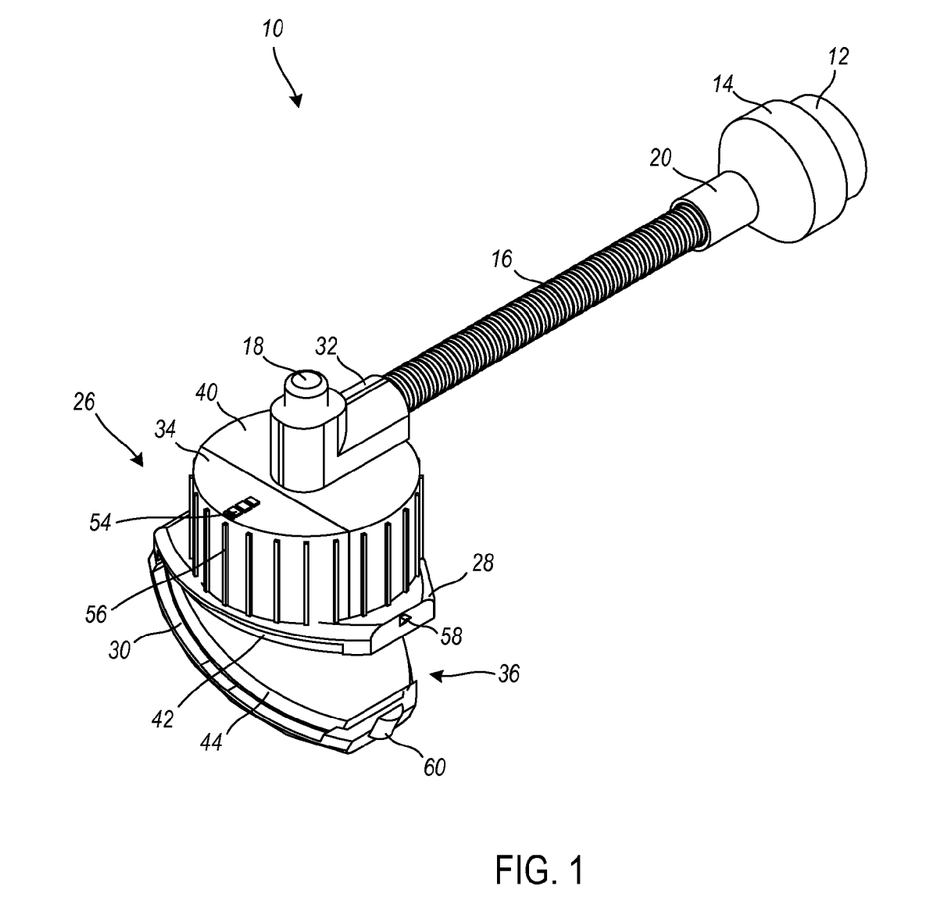
FIG. 1 is a front perspective view of an eyeglass light assembly configured for use on a temple of an eyeglass frame, illustrating, in particular, the clip assembly in a open position and the flexible stem having a light operatively powered on and adjustable by the wearer while eyeglasses are worn, according to an embodiment of the technology described herein.
Figure 2:
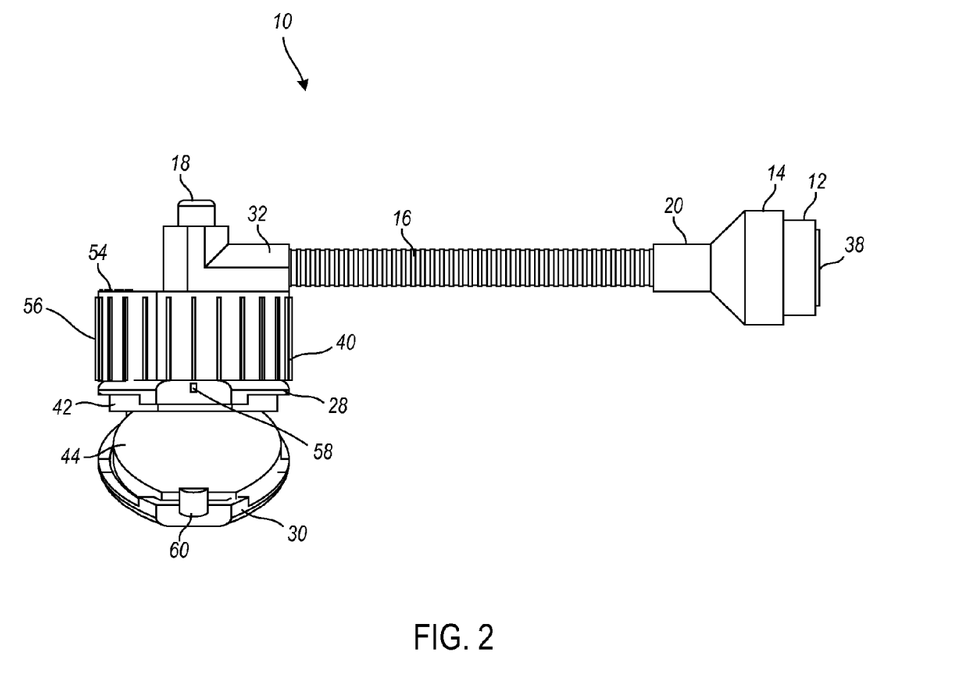
FIG. 2 is a side view of the eyeglass light assembly depicted in FIG. 1, illustrating, in particular, the clip assembly in a open position.
Figure 3:
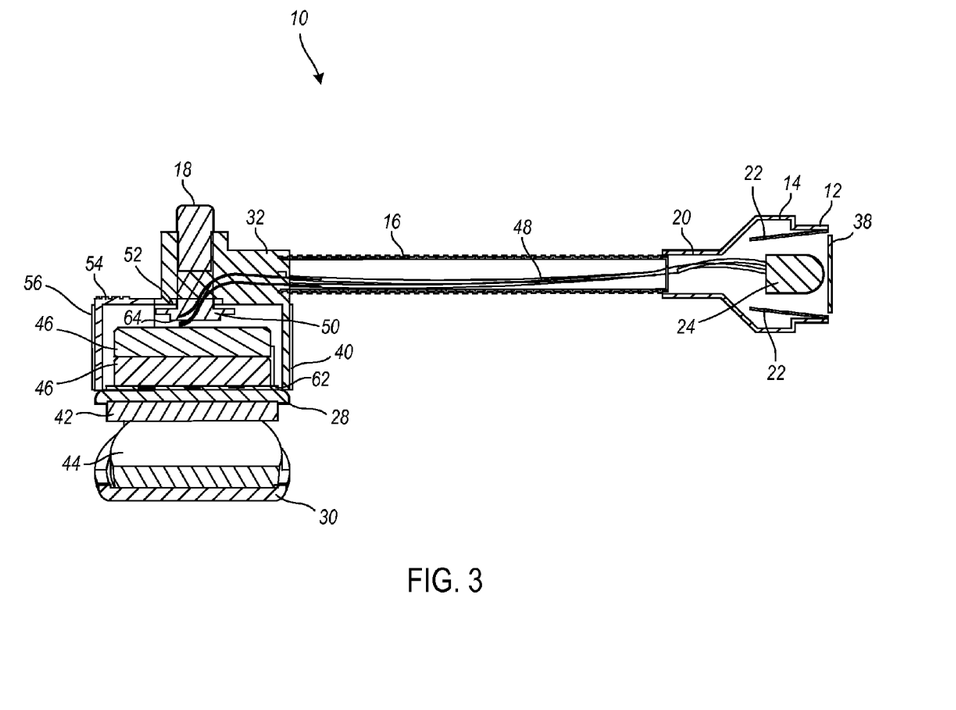
FIG. 3 is a side, cross-sectional view of the eyeglass light assembly depicted in FIG. 1, illustrating, in particular, internal components such as batteries, a wire harness, a reflector, and a light, according to an embodiment of the technology described herein.
Figure 4:
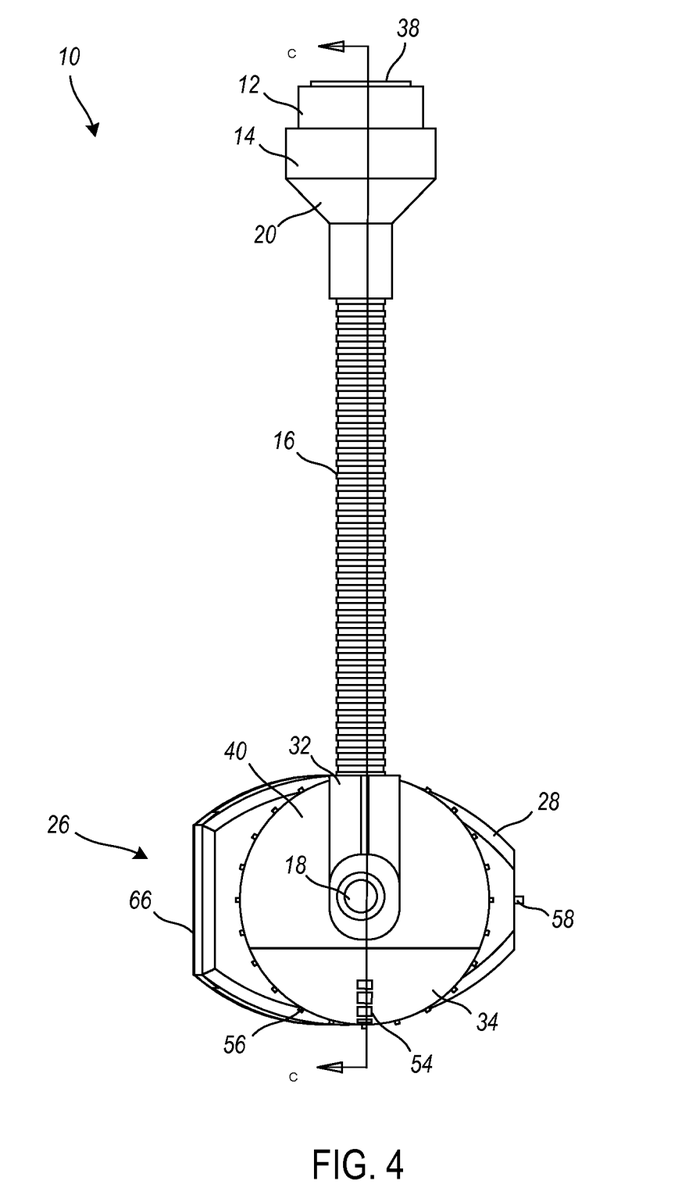
FIG. 4 is a top view of the eyeglass light assembly depicted in FIG. 1, illustrating, in particular, the power push button and housing door latch, according to an embodiment of the technology described herein.
Figure 5A:
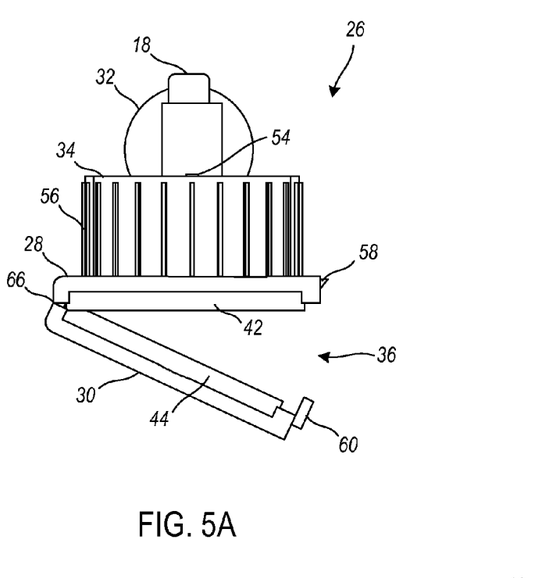
FIGS. 5A and 5B are end views of the base assembly, illustrating, in particular, the clip assembly in a open position and a ridged housing and alternative foam and latch arrangements, according to an embodiment of the technology described herein.
Figure 5B:
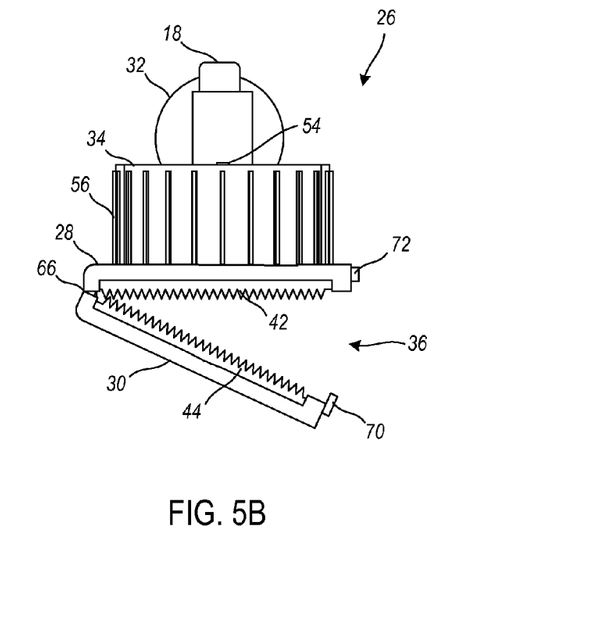
Figure 6:
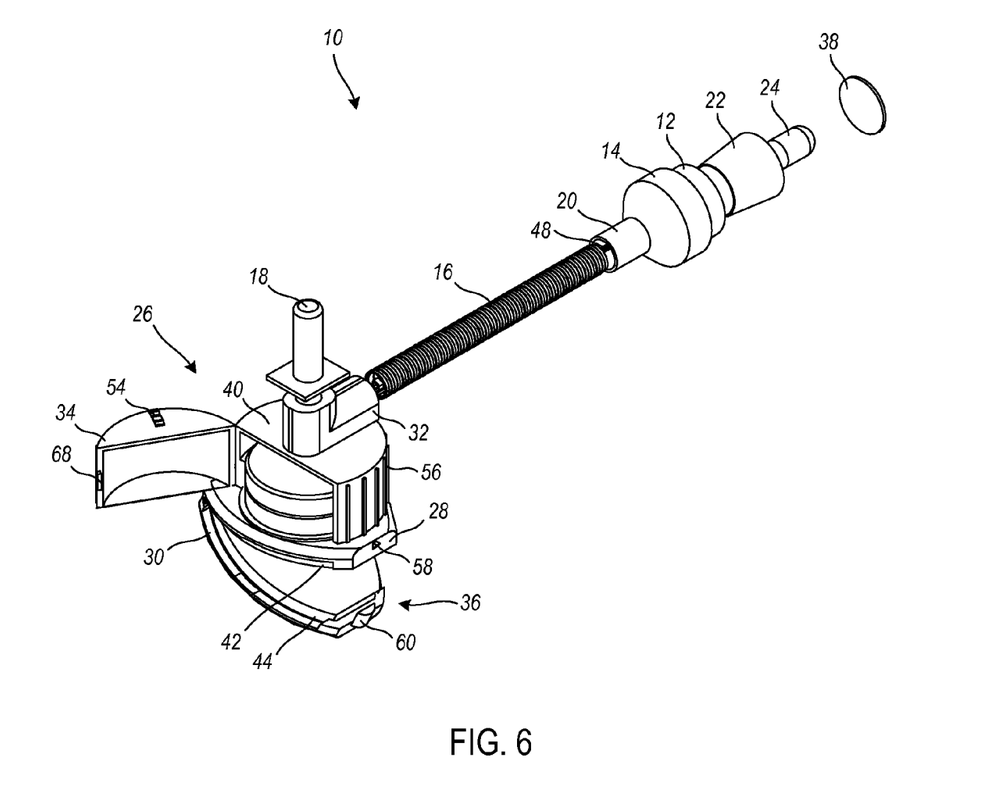
FIG. 6 is an expanded front perspective view of the eyeglass light assembly depicted in FIG. 1, illustrating, in particular, internal components such as batteries, a wire harness, a reflector, and a light.
Figure 7:
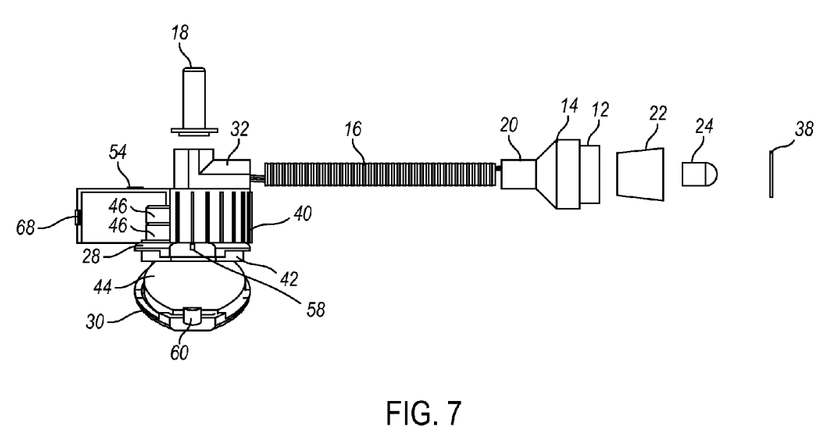
FIG. 7 is an expanded side view of the eyeglass light assembly depicted in FIG. 1, illustrating, in particular, internal components such as batteries, a wire harness, a reflector, and a light.
Figure 8:
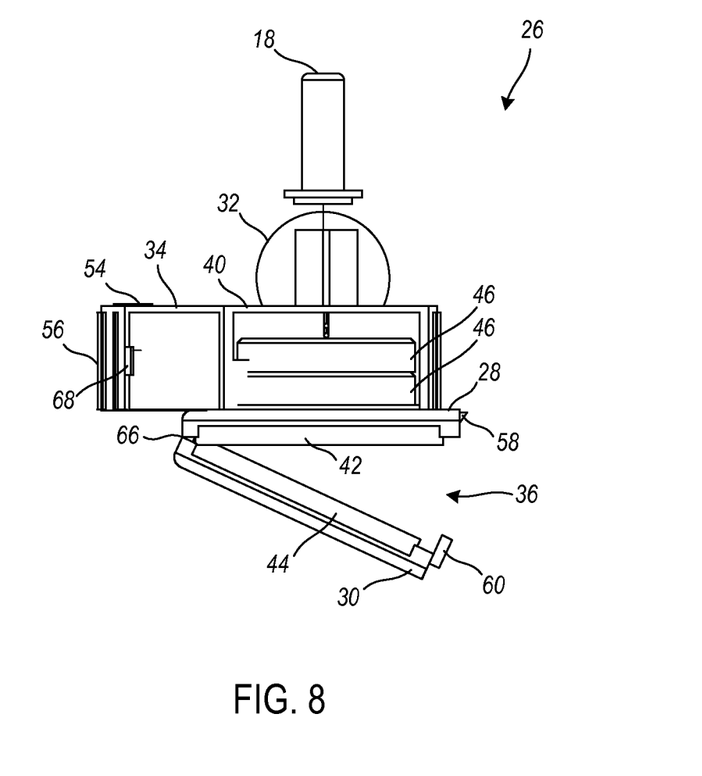
FIG. 8 is an expanded end view of the base assembly depicted in FIG. 5, illustrating, in particular, the clip assembly in a open position, a ridged housing, and the housing in open position, according to an embodiment of the technology described herein.
Figure 9:
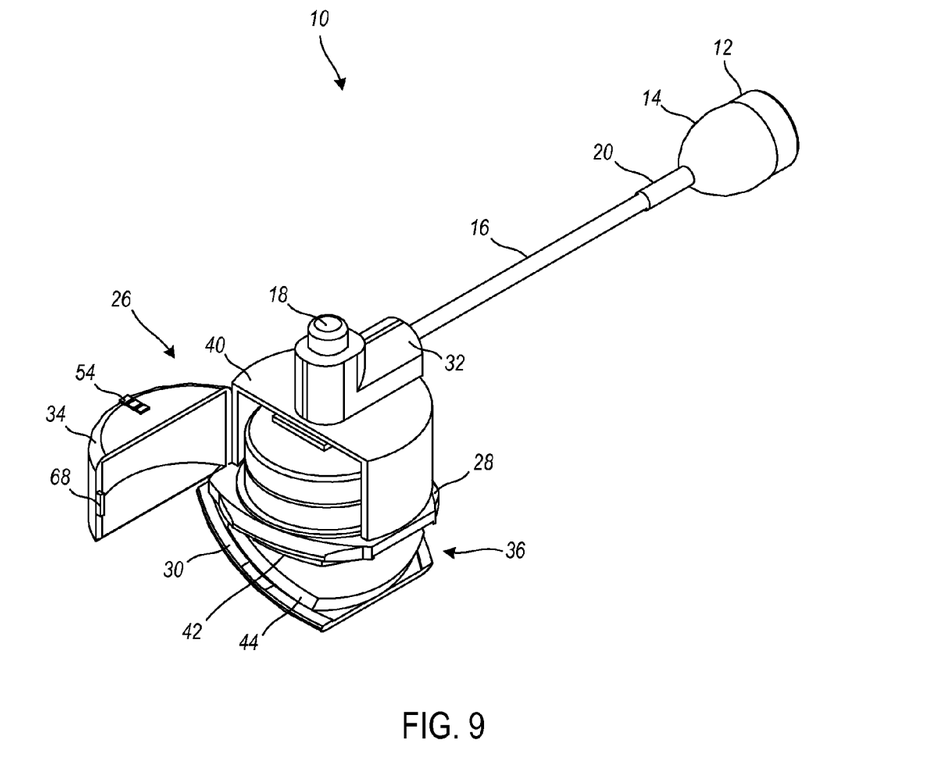
FIG. 9 is a front perspective view of an alternative embodiment of the eyeglass light assembly configured for use on a temple of an eyeglass frame, illustrating, in particular, the clip assembly in a open position and the flexible stem having a light operatively powered on and adjustable by the wearer while eyeglasses are worn, according to an embodiment of the technology described herein.
Figure 10:
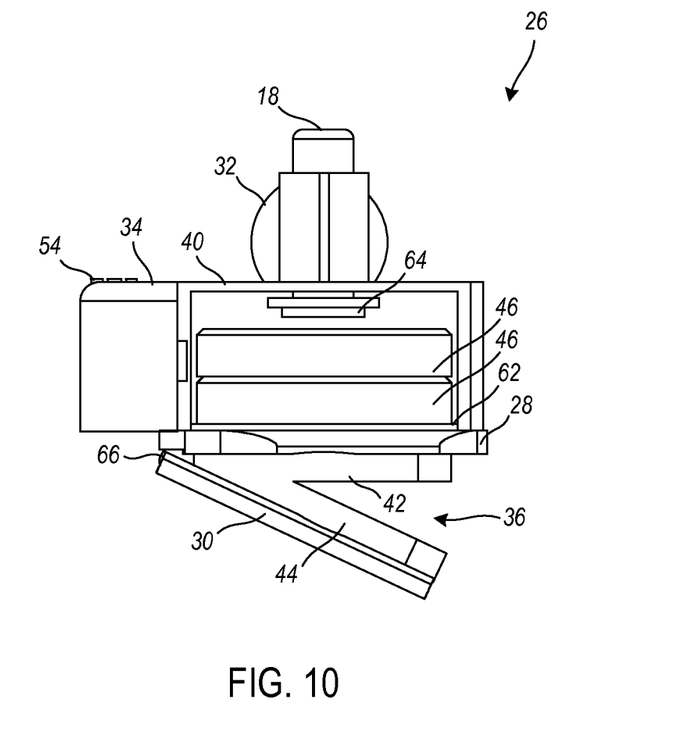
FIG. 10 is an end view of the base assembly of the eyeglass light assembly depicted in FIG. 9, illustrating, in particular, the clip assembly in a open position and the housing in open position, according to an embodiment of the technology described herein.

In such an embodiment, the first clip member 28 further includes a first pad 42, and the second clip member 30 further includes a second pad 44. The first pad 42 and the second pad 44 are configured to protect the eyeglass frame. The first pad 42 and the second pad 44 are foam in at least one embodiment. As specifically depicted in FIG. 5, the first pad 42 and the second pad 44 can vary. In 5A flat foam is depicted. In FIG. 5B ridged foam is depicted. The latter foam type is useful with frames having narrow temple areas.

In at least one embodiment, the first clip member 28 further includes a first latch 58, and the second clip member 30 further includes a second latch 60. The first latch 58 and the second latch 60 are configured to couple the first clip member 28 to the second clip member 30 to secure the eyeglass light assembly 10 to an eyeglass frame. The first latch 58 and the second latch 60 are operable by the user/wearer of the eyeglass light assembly 10.

In at least one embodiment, the first clip member 28 further includes a first magnet 70, and the second clip member 30 further includes a second magnet 72, as depicted in FIG. 5B. The first magnet 70 and the second magnet 72 are configured to couple the first clip member 28 to the second clip member 30 to secure the eyeglass light assembly 10 to an eyeglass frame. The first magnet 70 and the second magnet 72 are operable by the user/wearer of the eyeglass light assembly 10.

The eyeglass light assembly 10 includes a power source 46. The power source 46 is disposed within the base assembly 26 of the eyeglass light assembly 10 and is configured to power the light source, LED 24. In at least one embodiment, the power source 46 is a small battery or batteries. By way of example, the power source 46 includes two #2032 lithium batteries. However, in alternative embodiments, another suitable, lightweight power source 46 can be used. Additionally, in at least one alternative embodiment, one or more rechargeable battery is utilized. The power source 46 is preferably stored within the base 46. The power source 46 can be interchanged and or replaced by removal of the adapter 32 and adapter lid 34 from the base 26. The power source 46 can include more than one battery. As depicted, for example, in the Figures, two batteries are shown. As will be appreciated by one of ordinary skill in the art, upon reading this disclosure, the power source can vary in size, voltage, number, and so forth, so long as the LED 24, or like light source, is adequately powered.

The power button 18 can be connected to a contact strip 52 to actuate the circuit. Once actuated, the LED 24 is illuminated.

The power source 46 can be connected to a positive contact strip 62 and a negative contact strip 64. The positive contact strip 62 and a negative contact strip 64 are configured for electrical connectivity to a wiring harness 48 to couple to and power the LED 24.

In at least one embodiment, the eyeglass light assembly 10 can further include a controller 50. The controller 50 is configured to provide programmed functionality to the eyeglass light assembly 10. The controller 50 can be pre-programmed and unalterable by the wearer in one embodiment. Alternatively, the controller 50 can include settings reconfigurable by the wearer. Microcontrollers and integrated circuits are known in the art, and will be appreciated by one of ordinary skill in the art upon reading this disclosure as applicable for controlling aspects of eyeglass light assembly 10.

It is to be understood that the disclosure teaches just one example of the illustrative embodiment and that many variations of the invention can easily be devised by those skilled in the art after reading this disclosure and that the scope of the present invention is to be determined by the claims.

What is claimed is:

1. An eyeglass light assembly comprising:
   a light source housing disposed at a distal end of the eyeglass light assembly;
   a light source disposed within the light source housing and configured to illuminate in a direction away from the eyeglass light assembly;
   a generally cylindrical base housing consisting of ridges by which to improve user grip of the eyeglass light assembly;
   a latchable door disposed upon the base housing and configured to provide access to a power source; and
   a latch disposed upon the latchable door and configured to provide access to the base housing;
   wherein the base housing, latchable door, and the latch collectively form a base disposed at a proximal end of the eyeglass light assembly and configured to removably attach the eyeglass light assembly to an eyeglass frame;
   a first clip member having a first clip latch; and
   a second clip member having a second clip latch, hingedly coupled to the first clip member and fully parallel to a full length of the first clip member when in a closed position, wherein the first clip latch is coupled to the second clip latch;
   wherein the first clip member and second clip member are configured to releasably couple one to another wherein the first clip latch is coupled to the second clip latch to secure the eyeglass light assembly to a temple area of an eyeglass frame;
   a cushioning material disposed between the first clip member and the second clip member in order to protect the temple area of the eyeglass frame;
   a stem coupled to the light source housing disposed at the distal end of the eyeglass light assembly and coupled to the base disposed at the proximal end of the eyeglass light assembly;
   a power source disposed within the base of the eyeglass light assembly and configured to power the light source;
   a wiring assembly disposed generally within the stem of the eyeglass light assembly and configured to couple the power source to the light source to power the light source;
   an adapter, having a first receiving aperture generally cylindrical and in horizontal direction relative to the adapter and a second receiving aperture generally cylindrical and in vertical direction relative to the adapter, disposed upon the base housing to couple the stem to the base housing and to receive securely a proximal end of the stem, through the horizontal aperture, wherein the first and second aperture each provide access to the power source and wiring assembly for electronic communication; and
   a push button power switch disposed upon the adapter, within the vertical aperture, to actuate operatively the light source.

2. The eyeglass light assembly of claim 1, wherein the first clip member further comprises a first pad, wherein the second clip member further comprises a second pad, and wherein the first pad and the second pad are configured to protect the eyeglass frame.

3. The eyeglass light assembly of claim 1, wherein the first clip member further comprises a first magnet, wherein the second clip member further comprises a second magnet, and wherein the first magnet and the second magnet are configured to couple the first clip member to the second clip member to secure the eyeglass light assembly to an eyeglass frame.

4. The eyeglass light assembly of claim 1, wherein the eyeglass light assembly comprises an overall weight within the range of 0.1 ounces to 0.4 ounces in weight.

5. The eyeglass light assembly of claim 1, wherein the eyeglass light assembly comprises an overall weight within the range of 0.1 ounces to 0.9 ounces in weight.

6. An eyeglass light assembly to removably and interchangeably attach to an eyeglass frame, the eyeglass light assembly comprising:
   a light source housing disposed at a distal end of the eyeglass light assembly;
   a light source disposed within the light source housing and configured to illuminate in a direction away from the eyeglass light assembly;
   a generally cylindrical base housing consisting of ridges by which to improve user grip of the eyeglass light assembly;
   a latchable door disposed upon the base housing and configured to provide access to a power source; and
   a latch disposed upon the latchable door and configured to provide access to the base housing;
   wherein the base housing, latchable door, and the latch collectively form a base disposed at a proximal end of the eyeglass light assembly and configured to removably attach the eyeglass light assembly to an eyeglass frame; and
   a first clip member having a first clip latch; and
   a second clip member having a second clip latch, hingedly coupled to the first clip member and fully parallel to a full length of the first clip member when in a closed position, wherein the first clip latch is coupled to the second clip latch;
   wherein the first clip member and second clip member are configured to releasably couple one to another wherein the first clip latch is coupled to the second clip latch to secure the eyeglass light assembly to a temple area of an eyeglass frame;
   a cushioning material disposed between the first clip member and the second clip member in order to protect the temple area of the eyeglass frame;
   a stem coupled to the light source housing disposed at the distal end of the eyeglass light assembly and coupled to the base disposed at the proximal end of the eyeglass light assembly;
   a power source disposed within the base of the eyeglass light assembly and configured to power the light source;
   a wiring assembly disposed generally within the stem of the eyeglass light assembly and configured to couple the power source to the light source to power the light source; and
   an adapter, having a first receiving aperture generally cylindrical and in horizontal direction relative to the adapter and a second receiving aperture generally cylindrical and in vertical direction relative to the adapter, disposed upon the base housing to couple the stem to the base housing and to receive securely a proximal end of the stem, through the horizontal aperture, wherein the first and second aperture each provide access to the power source and wiring assembly for electronic communication; and a push button power switch disposed upon the adapter, within the vertical aperture, to actuate operatively the light source;

wherein the eyeglass light assembly comprises an overall weight within the range of 0.1 ounces to 0.9 ounces in weight; and wherein the eyeglass light is adapted to provide a multiplicity of angle, pivot, and rotation configurations for varied use and adaptation at directing emitted light from an eyeglass frame.

7. The eyeglass light assembly of claim 6, wherein the first clip member further comprises a first pad, wherein the second clip member further comprises a second pad, and wherein the first pad and the second pad are configured to protect the eyeglass frame.

8. An eyeglass light assembly to removably and interchangeably attach to an eyeglass frame, the eyeglass light assembly comprising:

a light source housing disposed at a distal end of the eyeglass light assembly;

a light source disposed within the light source housing and configured to illuminate in a direction away from the eyeglass light assembly;

a generally cylindrical base housing consisting of ridges by which to improve user grip of the eyeglass light assembly;

a latchable door disposed upon the base housing and configured to provide access to a power source; and a latch disposed upon the latchable door and configured to provide access to the base housing;

wherein the base housing, latchable door, and the latch collectively form a base disposed at a proximal end of the eyeglass light assembly and configured to removably attach the eyeglass light assembly to an eyeglass frame; and a first clip member having a first clip latch; and a second clip member having a second clip latch, hingedly coupled to the first clip member and fully parallel to a full length of the first clip member when in a closed position, wherein the first clip latch is coupled to the second clip latch;

wherein the first clip member and second clip member are configured to releasably couple one to another wherein the first clip latch is coupled to the second clip latch to secure the eyeglass light assembly to a temple area of an eyeglass frame;

a cushioning material disposed between the first clip member and the second clip member in order to protect the temple area of the eyeglass frame;

a stem coupled to the light source housing disposed at the distal end of the eyeglass light assembly and coupled to the base disposed at the proximal end of the eyeglass light assembly;

a power source disposed within the base of the eyeglass light assembly and configured to power the light source;

a wiring assembly disposed generally within the stem of the eyeglass light assembly and configured to couple the power source to the light source to power the light source; and an adapter, having a first receiving aperture generally cylindrical and in horizontal direction relative to the adapter and a second receiving aperture generally cylindrical and in vertical direction relative to the adapter, disposed upon the base housing to couple the stem to the base housing and to receive securely a proximal end of the stem, through the horizontal aperture, wherein the first and second aperture each provide access to the power source and wiring assembly for electronic communication; and a push button power switch disposed upon the adapter, within the vertical aperture, to actuate operatively the light source;

wherein the eyeglass light assembly comprises an overall weight within the range of 0.1 ounces to 0.4 ounces in weight; and wherein the eyeglass light is adapted to provide a multiplicity of angle, pivot, and rotation configurations for varied use and adaptation at directing emitted light from an eyeglass frame.

9. The eyeglass light assembly of claim 8, wherein the first clip member further comprises a first pad, wherein the second clip member further comprises a second pad, and wherein the first pad and the second pad are configured to protect the eyeglass frame; and wherein the first clip member further comprises a first latch, wherein the second clip member further comprises a second latch, and wherein the first latch and the second latch are configured to couple the first clip member to the second clip member to secure the eyeglass light assembly to an eyeglass frame.

* * * * *